(12) United States Patent
Dogan

(10) Patent No.: US 8,268,930 B2
(45) Date of Patent: Sep. 18, 2012

(54) EPDM PRODUCTION AND REFORMATION PROCESS FOR RUBBER PRODUCTS

(76) Inventor: Yavuz Dogan, Istanbul (TR)

( * ) Notice: Subject to any disclaimer, the term of this patent is extended or adjusted under 35 U.S.C. 154(b) by 0 days.

(21) Appl. No.: 12/865,098

(22) PCT Filed: Jan. 21, 2009

(86) PCT No.: PCT/TR2009/000010
§ 371 (c)(1),
(2), (4) Date: Jul. 28, 2010

(87) PCT Pub. No.: WO2009/096909
PCT Pub. Date: Aug. 6, 2009

(65) Prior Publication Data
US 2010/0311885 A1    Dec. 9, 2010

(30) Foreign Application Priority Data
Jan. 28, 2008   (TR) .............................. A 2008/00541

(51) Int. Cl.
*C08F 8/34*   (2006.01)
*C08F 210/18*   (2006.01)

(52) U.S. Cl. .................................................. 525/331.8

(58) Field of Classification Search ................ 525/331.8
See application file for complete search history.

(56) References Cited

U.S. PATENT DOCUMENTS

| 6,015,861 | A |   | 1/2000 | Mertzel |   |
|---|---|---|---|---|---|
| 2009/0206511 | A1 | * | 8/2009 | De Paiva et al. | 264/211.12 |

FOREIGN PATENT DOCUMENTS

| CA | 2396238 A1 |   | 2/1998 |
|---|---|---|---|
| JP | 56162614 A |   | 12/1981 |
| JP | 2008046 A |   | 1/1990 |
| WO | 2004/045830 A |   | 6/2004 |
| WO | WO 2006/110971 | * | 10/2006 |

OTHER PUBLICATIONS

International Search Report of the International Searching Authority dated Sep. 9, 2010.
Written Opinion of the International Searching Authority dated Sep. 9, 2010.
Communication from the International Searching Authority dated Sep. 10, 2010.
International Search Report of the International Searching Authority dated Jul. 2, 2009.
Written Opinion of the International Searching Authority dated Jul. 2, 2009.
Examination Report from the Russian Patent Office, mailed Jul. 15, 2011.

* cited by examiner

*Primary Examiner* — Peter Szekely
(74) *Attorney, Agent, or Firm* — Amster, Rothstein & Ebenstein LLP

(57) ABSTRACT

The invention constituting the subject matter of this application is related to the production method and process regarding any and all products created by forming the EPDM rubber including a mixture of ethylene, propylene and diene by using heat and particularly the seal of the door gasket, which is a part of the washing machines.

5 Claims, 1 Drawing Sheet

EPDM PRODUCTION AND REFORMATION PROCESS FOR RUBBER PRODUCTS

FIELD OF THE INVENTION

The present disclosure relates to methods for manufacturing EPDM (ethylene propylene diene monomer) rubber by using heat, and in particular to EPDM rubber products that form the seal of a door gasket of a washing machine.

BACKGROUND

According to known manufacturing and packaging methods, EPDM rubber products, such as seals of door gaskets of washing machines, are formed using heat and the finished products are packaged and transported in their final manufactured form.

Stowage of EPDM rubber goods requires a wide space and accordingly increases the transportation costs.

Seals of door gaskets, for example, are specifically stowed in boxes with a capacity of up to 54 seals; and only 32 boxes (1,728 seals) can be loaded to a high-cube container of 65 cubic meters. Since the packaged materials are not rigid, the packages themselves are also not rigid. This often leads to the packages becoming damaged during transport and a significant portion of the goods becoming undeliverable.

SUMMARY OF THE INVENTION

Various exemplary embodiments of the present invention involves controlled deformation of EPDM rubber goods so as to facilitate transportation of the products to the relevant location, eliminating the deformation by heating the goods in a reformation furnace after the transportation, and restoring the goods after the transportation to the form that was present at the time at which the goods were removed from a mold.

An object of the present invention is to provide rigidity in packaging and transportation, thereby decreasing the number of products reduced by ullage and decreasing transportation costs.

Another object of the present invention is to improve the packaging and the transportation processes regarding any and all kinds of goods given form by heating EPDM rubber and preventing the deformation of the goods during the transportation.

BRIEF DESCRIPTION OF THE DRAWINGS

The features and advantages of the present invention will be more fully understood with reference to the following, detailed description of an illustrative embodiment of the present invention when taken in conjunction with the accompanying figures, wherein.

DETAILED DESCRIPTION OF PREFERRED EMBODIMENTS

Figure 1:
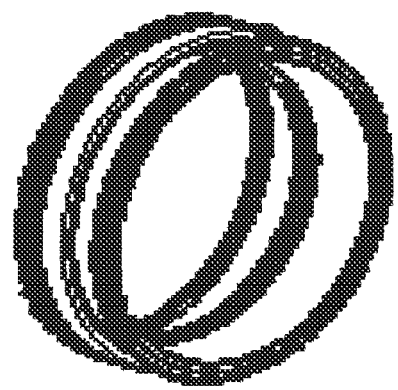
FIG. 1 is a perspective view of a product before being subjected to the controlled deformation process according to an exemplary embodiment of the present invention.
Figure 2:
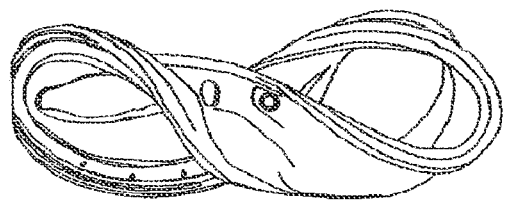
FIG. 2 is a perspective view of the product of FIG. 1 after being subjected to the controlled deformation process according to an exemplary embodiment of the present invention.

Various exemplary embodiments of the present invention include the steps of reforming products (particularly the seals of door gaskets of a washing machine), manufactured by vulcanization of EPDM rubber, from their final ready-to-use forms to a new form, transporting such products in the new form, and restoring the products to their original form by using their thermal memory (reformation) at the place where such products are to be used. FIG. 1 is a perspective view of an EPDM rubber product in a ready to-use form, and FIG. 2 is a perspective view of the same EPDM rubber product after controlled deformation.

Components of an exemplary EPDM rubber product according to an exemplary embodiment of the present invention are described below:

| Component | Parts per Hundred Rubber (phr) |
|---|---|
| EPDM | 100,000 |
| Precipitated silica | 30,000 |
| Kaolin | 100,000 |
| Paraffinic oil | 90,000 |
| STRUKTOL ® EM 16 (fatty acid derivative lubricant) | 1,500 |
| Si 69 (Bis-[Y-(triethoxysilyl)-propyl]-tetrasulfide) | 4,000 |
| Zinc Oxide | 5,000 |
| Stearic Acid | 1,250 |
| PEG (polyethylene glycol) | 3,000 |
| Titanium Dioxide | 10,000 |
| Blue Pigment | 1,000 |
| N 550 (carbon black) | 200 |
| Sulphur 80 (sulfur) | 1,400 |
| CBS (N-cyclohexyl-2-benzothiazole sulfonamide) | 1,750 |
| ZDBC (zinc dibutyl dithiocrabamate) | 1,750 |
| ZDEC (zinc diethyl dithiocarbamate) | 1,750 |
| TMTD (tetramethylthiuramdisulfide) | 1,250 |

The goods according to various exemplary embodiments of the present invention may be produced by mixing the raw materials, whose formulas are given in the chart above, heating them in a furnace and vulcanizing them.

The goods produced are deformed under control for packaging and transportation, and the products deformed under control are restored to their original forms by using reforming furnaces.

Any closed furnace may be used for the reformation process.

Figure 3:
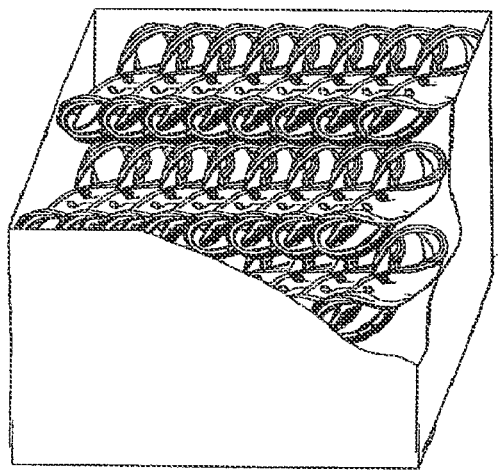
FIG. 3 shows packaged products that have been subject to the controlled deformation process according to an exemplary embodiment of the present invention.

The products which are created by heating EPDM rubber and whose forms (particularly those which are round or ellipsoid) are finalized (FIG. 1) are subject to controlled deformation without using heat (FIG. 2) and packaged in this later form, as shown in FIG. 3.

The products packaged and transported after being subject to a controlled deformation without using heat, are restored to their original forms after being processed in a reshaping furnace.

The products may be restored to their original form by exposing the products to a temperature within the range of 300-375° F. for a period of 90 to 180 seconds.

The invention claimed is:

1. A method of transporting EPDM (ethylene propylene diene monomer) rubber products, comprising the steps of:
    subjecting the EPDM rubber products to controlled deformation without applying heat so that the EPDM rubber products are transformed from an original configuration to a shipping configuration;
    shipping the EPDM rubber products in the shipping configuration; and reforming the EPDM rubber products in the shipping configuration to the original configuration upon completion of shipping.

2. The method of claim 1, wherein the EPDM rubber products are made from the following components: EPDM, Precipitated Silica, Kaolin, Paraffinic Oil, a fatty acid derivative lubricant, bis-[Y-(triethoxysilyl)-propyl]-tetrasulfide), Zinc Oxide, Stearic Acid, PEG (polyethylene glycol), Titanium dioxide, Blue pigment, carbon black, sulphur, CBS (N-Cyclohexy-2-benzothiazole sulfonamide), ZDBC (zinc dibutyldithiocarbamate), ZDEC (zinc diethyl dithiocarbamate) and TMTD (tetramethylthiuramdisulfide).

3. The method of claim 1, further comprising the step of packaging the EPDM rubber products after the subjecting step.

4. The method of claim 1, wherein the step of reforming comprises removing the EPDM rubber products from the packaging and conducting a reformation treatment on the EPDM rubber products.

5. The method of claim 4, wherein the reformation treatment comprises exposing the EPDM rubber products to a temperature within the range of 300-375° F. for a period of 90 to 180 seconds in a forming furnace.

* * * * *